US006656399B1

(12) United States Patent
Buecking et al.

(10) Patent No.: US 6,656,399 B1
(45) Date of Patent: Dec. 2, 2003

(54) METHOD FOR PRODUCING SHAPED BODIES

(75) Inventors: Hans-Guenter Buecking, Springe (DE); Ralf Wuttke, Springe (DE); Ernst Brinkmann, Obenkirchen (DE)

(73) Assignee: Valmet Panelboard GmbH, Hannover (DE)

( * ) Notice: Subject to any disclaimer, the term of this patent is extended or adjusted under 35 U.S.C. 154(b) by 0 days.

(21) Appl. No.: 09/700,624

(22) PCT Filed: May 7, 1999

(86) PCT No.: PCT/EP99/03155

§ 371 (c)(1), (2), (4) Date: Apr. 4, 2001

(87) PCT Pub. No.: WO99/59786

PCT Pub. Date: Nov. 25, 1999

(30) Foreign Application Priority Data

May 19, 1998 (DE) ........................................ 198 22 485

(51) Int. Cl.[7] .......................... B29B 11/14; B29B 13/10

(52) U.S. Cl. ....................... 264/115; 264/122; 264/124; 264/126

(58) Field of Search ................................. 264/109–128

(56) References Cited

U.S. PATENT DOCUMENTS

| | | | | |
|---|---|---|---|---|
| 5,017,319 A | * | 5/1991 | Shen | 264/124 |
| 5,607,546 A | | 3/1997 | Hoeglund et al. | |
| 5,656,129 A | | 8/1997 | Good et al. | |
| 5,821,214 A | | 10/1998 | Weibel | |
| 5,932,038 A | * | 8/1999 | Bach et al. | 156/62.2 |
| 6,346,165 B1 | * | 2/2002 | Markessini et al. | 156/296 |

FOREIGN PATENT DOCUMENTS

| | | |
|---|---|---|
| DE | 3021455 A1 | 12/1981 |
| DE | 3021455 C2 | 1/1987 |
| DE | 4432952 A1 | 6/1995 |
| GB | 2084212 A | 4/1982 |
| GB | 2185748 A | 7/1987 |
| WO | WO 97/38833 | 10/1997 |

OTHER PUBLICATIONS

Sefain, Magdi Z., et al., “Impregnation of Rice Straw Hardboards”, *Holzforschung*, 38 (1984) 353–355.

*Chemical Abstracts*, vol. 127, No. 10, 1997, pp. 747–748.

* cited by examiner

*Primary Examiner*—Stephen J. Lechert, Jr.

(74) *Attorney, Agent, or Firm*—Townsend and Townsend and Crew, LLP

(57) ABSTRACT

Shaped bodies, such as boards, are manufactured from particles having a surface with a wax layer, such as straw, hemp stalks, maize stalks, grapevine stalks and the like. The particles are first comminuted, then heated and then further comminuted. Thereafter the particles are admixed with a binder to form a mixture, the mixture is scattered into a mat, and the mat is then pressed into the shaped body of the desired size.

11 Claims, No Drawings

METHOD FOR PRODUCING SHAPED BODIES

This application claims the benefit under 35 U.S.C. 371 of PCT/EP 99/03155 filed May 7, 1999.

The present invention relates to a method of manufacturing shaped bodies, in particular plates, from particles having a surface with a wax layer, in particular straw, hemp stalks, maize stalks, grapevine stalks or the like, which are scattered to form a mat and subsequently pressed to form the shaped body.

A method of this kind is known from DE-OS 3 021 455. In this method, the particles are first comminuted by chopping in a first process step, whereupon they are split up into chip fibers in a second, subsequent step.

In a further subsequent process step, the chip fibers are dried, whereupon the dried chip fibers are admixed with a binder and a paraffin emulsion.

The particles which have been coated with glue in this way are further comminuted in a further process step, with the further comminution of the glue-coated particles being important to the method described in this publication. It is namely specified that the number of those particles surfaces which have an unfavorable effect on the later bonding during the pressing of the mat are substantially reduced by said further comminution of the glue-coated particles. At the same time, the binder is distributed even better to all now present surfaces of the particles, and thus further homogenized, during the further comminution due to the smearing effect known from chip gluing.

While boards with good strength properties are generated with the method described in DE-OS 3 021 455, a relatively high binder content and the addition of a paraffin emulsion is required. Furthermore, a relatively large number of separate process steps are required, with each process step increasing the costs of the process.

It is the object of the invention to develop a method of the kind first mentioned such that the required proportion of binder can be reduced and the number of required process steps reduced.

This object is satisfied in accordance with the invention starting from a method of the kind first mentioned by the particles first being comminuted in a single process step, being heated in a following process step and further comminuted in a subsequent process step and a binder begin finally admixed with the further comminuted particles.

It has surprisingly been found that, on the one hand, a separate process step to split up the comminuted particles subsequent to the first comminution process can be dispensed with if, in accordance with the invention, the comminuted particles are first immediately heated, then further comminuted and only then admixed with a binder. On the other hand, with this procedure, the quantity of binder required can be reduced with respect to the known methods without impairing the strength properties of the plates generated.

The method in accordance with the invention is thus simpler and of lower cost than the method of the kind first mentioned, since both a separate process step can be saved and the required proportion of binder reduced. Whereas the required dosage of the binder in the method of the kind first mentioned is given as 6% solid resin/atro straw, in the method in accordance with the invention a dosage of approximately 4.5% is sufficient.

In accordance with an advantageous embodiment of the invention, the comminuted particles are roasted, that is heated for so long and/or to such a temperature that they attain a certain brittle porosity, in particular at their surfaces, in particular so that cracks occur on the surfaces of the particles. The wax layer present on the surface of the particles splits off during the further comminution process following the heating due to the brittle porosity of the particles created by the heating in accordance with the invention. This achieves two positive effects. On the one hand, the addition of a separate paraffin emulsion can be omitted since the split off wax particles take on its function. On the other hand, the binder added after the further comminution is absorbed better by the surface of the particles now freed of the wax layer so that less binder needs to be added in total.

In the following, typical manufacturing and quality characteristics are given by way of a preferred embodiment of the manufacturing method in accordance with the invention:

The starting particles are poured into a chopper with an initial moisture content, for example, of approximately 15% and are there comminuted in one single process step. The comminuted particles are subsequently heated and thereby dried until they have a moisture content of approximately 2–3% by weight.

A roasting of the comminuted particles is effected by the heating, whereby in particular the surface of the particles attains a brittle porosity which presents itself, for example, as irregularly arranged cracks on the surfaces of the particles.

In a next process step, the roasted particles are further comminuted, whereby the wax layer present on the surface splits off and the split-off particles are mixed with the further comminuted particles. The further comminuted, non-fractionated particles are admixed with binder to an amount of approximately 4.5%/atro straw so that a glued moisture content of approximately 4% by weight is achieved.

The glue-coated particles are scattered to form a mat using suitable scattering methods and pressed to form the desired shaped bodies, for example, at 200° C. under a compression pressure of max. 3.5 N/mm$^2$ for a compression time factor of, for example, 11.5 seconds per millimeter of thickness of the mat. With a mat thickness of approximately 19 mm, a compression time of approximately 3.6 minutes thus results.

Typical quality characteristics of a board manufactured in accordance with the method in accordance with the invention are:

| | |
|---|---|
| Board thickness | 19 mm |
| Bulk density | 640 kg/m$^3$ |
| Bending strength | 16 N/mm$^2$ |
| Transverse tensile strength | 0.57 N/mm$^2$ |
| 2 hours of swelling | 3.2% |
| 24 hours of swelling | 16.5% |

What is claimed is:

1. A method of manufacturing shaped bodies comprising first comminuting particles having a surface with a wax layer, thereafter heating the comminuted particles, further comminuting the heated particles, thereafter admixing the further comminuted particles with a binder to form a mixture, scattering the mixture to form a mat, and pressing the mat into the shaped body.

2. A method according to claim 1 including selecting the particles from the group comprising straw, hemp stalks, maize stalks and grapevine stalks.

3. A method according to claim 1 wherein comminuting the particles, further comminuting the heated particles and admixing comprise an integrated, continuous process.

4. A method according to claim 1 wherein heating the comminuted particles comprises heating the comminuted particles to a temperature at which their surfaces attain brittle porosity.

5. A method according to claim 1 wherein heating comprises heating the comminuted particles to a temperature at which cracks occur on the surface of the comminuted particles.

6. A method according to claim 1 wherein heating comprises heating the comminuted particles until they have a moisture content of about 0 to 5% by weight.

7. A method according to claim 6 wherein heating comprises heating the comminuted particles until their moisture content is between about 2 to 3% by weight.

8. A method according to claim 1 wherein comminuting comprises chopping the particles.

9. A method according to claim 1 wherein further comminuting the particles is carried out while the particles are still in their heated state following the heating step.

10. A method according to claim 1 wherein the particles comprise elongated fibers, and wherein further comminuting the particles comprises further comminuting the particles in their longitudinal direction and a direction transverse to the longitudinal direction.

11. A method according to claim 1 wherein pressing the mat into the shaped body comprises pressing the mat into a board.

* * * * *